US008964752B2

(12) United States Patent
Zhang et al.

(10) Patent No.: US 8,964,752 B2
(45) Date of Patent: Feb. 24, 2015

(54) METHOD AND SYSTEM FOR FLOW TABLE LOOKUP PARALLELIZATION IN A SOFTWARE DEFINED NETWORKING (SDN) SYSTEM

(71) Applicant: Telefonaktiebolaget L M Ericsson (PUBL), Stockholm (SE)

(72) Inventors: Ying Zhang, San Jose, CA (US); Neda Beheshti-Zavareh, San Jose, CA (US); Ludovic Beliveau, Montreal (CA)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 135 days.

(21) Appl. No.: 13/855,611

(22) Filed: Apr. 2, 2013

(65) Prior Publication Data

US 2014/0241356 A1 Aug. 28, 2014

Related U.S. Application Data

(60) Provisional application No. 61/769,083, filed on Feb. 25, 2013.

(51) Int. Cl.
*H04L 12/28* (2006.01)
*H04L 12/741* (2013.01)
*H04L 12/721* (2013.01)

(52) U.S. Cl.
CPC .............. *H04L 45/745* (2013.01); *H04L 45/38* (2013.01); *H04L 45/54* (2013.01)
USPC ..................................... 370/392; 370/395.31

(58) Field of Classification Search
USPC ........................................................ 370/392
See application file for complete search history.

(56) References Cited

U.S. PATENT DOCUMENTS

| 7,889,666 B1 * | 2/2011 | Pei et al. ....................... 370/242 |
| 2011/0038375 A1 | 2/2011 | Liu et al. |
| 2014/0105215 A1 * | 4/2014 | Mogul et al. ............. 370/395.32 |

FOREIGN PATENT DOCUMENTS

WO WO-2011148306 A1 12/2011

OTHER PUBLICATIONS

"OpenFlow Switch Specification", Version 1.3.0 (Wire Protocol 0x04), Jun. 25, 2012, 106 pages.

(Continued)

*Primary Examiner* — Sai-Ming Chan
(74) *Attorney, Agent, or Firm* — Blakely Sokoloff Taylor & Zafman LLP

(57) ABSTRACT

A method implemented in a Software Defined Networking (SDN) network for flow table lookup parallelization is disclosed. The SDN network contains at least a SDN controller and at least a forwarding element and the SDN network utilizes a plurality of flow tables to perform lookup for forwarding traffic. The method starts with determining dependency of flow tables within the forwarding element using a set of dependency determination rules. A dependency graph is then constructed based on determined dependency of flow tables. A dependency degree count for each flow table within the forwarding element is determined based on the dependency graph. Based on the dependency degree count determination for each flow table, a plurality of parallel lookup groups (PLGs) for the forwarding element is formed, where each parallel lookup group contains one or more flow tables having a same dependency degree count.

20 Claims, 10 Drawing Sheets

(56) References Cited

OTHER PUBLICATIONS

"OpenFlow Switch Specification", Version 1.3.1 (Wire Protocol 0x04), Sep. 6, 2012, 128 pages.

"OpenFlow Switch Specification", Version 1.3.2 (Wire Protocol 0x04), Apr. 25, 2013, 131 pages.

Kanizo et al., "Palette: Distributing Tables in Software-Defined Networks", INFOCOM, 2013 Proceedings IEEE, Apr. 14, 2013, 12 pages.

Rojas-Cessa et al., "Parallel-Search Trie-based Scheme for Fast IP Lookup", Global Telecommunications Conference, 2007 IEEE, Nov. 1, 2007, pp. 210-214.

"OpenFlow Switch Specification", Version 1.1.0 Implemented (Wire Protocol 0x02), Feb. 28, 2011, 56 pages.

"Software-Defined Networking: The New Norm for Networks", Apr. 13, 2012, Open Networking Foundation, 12 pages.

Mckeown, Nick, et al., "OpenFlow: Enabling Innovation in Campus Networks", Mar. 14, 2008, SIGCOMM, 6 pages.

\* cited by examiner

| Match field | Instructions |
|---|---|
| IPv4 Source IP address | Set MPLS label, Goto table j |
| IPv4 Source IP address | Set MPLS label, Goto table k |

Portion of Flow Table 502

FIG. 5A

| Match field | Instructions |
|---|---|
| Source Ethernet ID | Set Source IP address, Goto table j |

Portion of Flow Table 504

| Match field | Instructions |
|---|---|
| Source IP address | Set MPLS lable, Goto table k |

Portion of Flow Table 506

FIG. 5B

| Match field | Instructions |
|---|---|
| Source Ethernet ID | Set Source IP address, Goto table j |

Portion of Flow Table 508

| Match field | Instructions |
|---|---|
| Source VLAN ID | Set Source IP address, Goto table k |

Portion of Flow Table 510

FIG. 5C

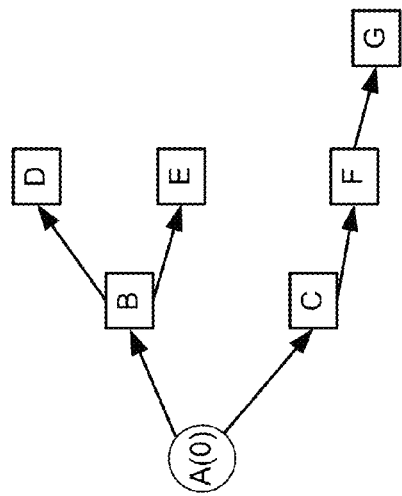
FIG. 8B
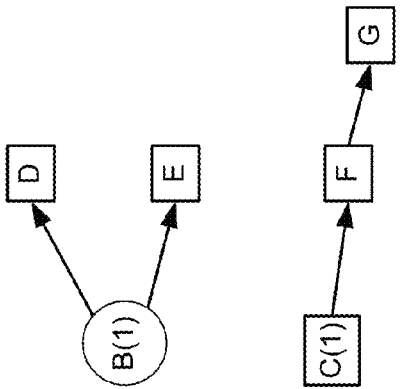
FIG. 8D
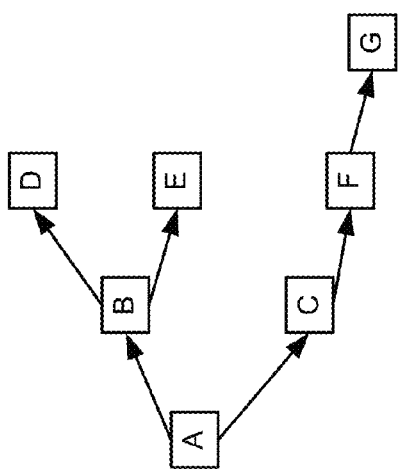
FIG. 8A
FIG. 8C

METHOD AND SYSTEM FOR FLOW TABLE LOOKUP PARALLELIZATION IN A SOFTWARE DEFINED NETWORKING (SDN) SYSTEM

CROSS-REFERENCE TO RELATED APPLICATION

This application claims priority from U.S. Provisional Patent Application No. 61/769,083, filed on Feb. 25, 2013.

FIELD

The embodiments of the invention are related to the field of packet forwarding in a data network. More specifically, the embodiments of the invention relate to a method and system to improve efficiency of flow table lookup at a Software Defined Networking (SDN) system.

BACKGROUND

In a traditional data network, the functions relating forwarding traffic and determining where to send traffic is done by a single apparatus. For example, an Ethernet switch in a data network is commonly said to contain a control plane and a data plane. The data plane sometimes referred to as a forwarding plane or a media plane. Data networks are sometimes referred to as computer networks, computing networks, or simply networks. These terms are used interchangeably in this specification.

For an Ethernet switch in a traditional data network for example, a control plane typically determines how an Ethernet frame is to be forwarded (e.g., the next hop for the frame and the outgoing port for the frame), and the data plane is in charge of forwarding the frame. The control plane typically includes one or more forwarding/routing protocols (e.g., Border Gateway Protocol (BGP), Interior Gateway Protocol(s) (IGP) (e.g., Open Shortest Path First (OSPF), Spanning Tree Protocol (STP), Intermediate System to Intermediate System (IS-IS), Label Distribution Protocol (LDP), Internet Control Message Protocol (ICMP)) that communicate with other network devices to exchange paths and select those paths based on one or more metrics. The data plane forwards frames based on input from the control plane.

The traditional integrated approach of the control plane and the data plane being tightly coupled in a single box may result in an overly complicated control plane and complex network management. Due to high complexity, equipment vendors and network operators are often reluctant to initiate changes and the network itself can become fragile and hard to manage over time. This is known to create a large burden and high barrier to new protocol and technology developments.

Software Defined Networking (SDN) is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices. With these benefits, SDN architecture based systems (referred to as SDN systems or SDN networks exchangeably herein below) are gaining popularity among carriers and enterprises.

One approach to popularize SDN architecture is to apply globally aware and topology decoupled software control at the edges of a core network. The assumption is that traditional topology-coupled network devices drive core networks (often an IP based networks), and SDN architecture should keep scalability, interoperability, high-availability, and extensibility of the core network intact. Thus a set of open commands for forwarding traffic has been defined in the form of a protocol known as OpenFlow (OF). The OpenFlow protocol enables globally aware centralized or distributed software controllers to drive the network edge hardware in order to create an easily programmable identity based overlay on top of the traditional core networks. The OpenFlow protocol has been standardized by specifications. For example, the Open Networking Foundation (ONF), an industrial consortium focusing on commercializing SDN and its underlying technologies, has been promoting OpenFlow specifications (latest version being 1.3.2, approved in September 2012).

In a SDN network, flow tables are used to direct traffic routing, where a field of a flow table matching with a field of an incoming traffic directs an incoming traffic to take instructions within the flow table. In early SDN architectures, a large flat table has been proposed to forward traffic. Yet a single table for traffic forwarding comes with complex rules associated with the single table. Thus, later SDN architectures (e.g., one complying with OpenFlow specification version 1.1.0) utilize multiple tables for traffic processing in a SDN network. When multiple tables are utilized, how to optimize multiple flow table lookup is a challenge.

SUMMARY

A method implemented in a Software Defined Networking (SDN) network for flow table lookup parallelization is disclosed. The SDN network contains at least a SDN controller to coordinate traffic forwarding and at least a forwarding element to forward traffic and the SDN network utilizes a plurality of flow tables to perform lookup for forwarding traffic at the forwarding element. The method starts with determining dependency of flow tables within the forwarding element using a set of one or more dependency determination rules. A dependency graph is then constructed based on determined dependency of flow tables. A dependency degree count for each flow table within the forwarding element is determined based on the dependency graph. Based on the dependency degree count determination for each flow table, a plurality of parallel lookup groups (PLGs) for flow tables on the same forwarding element is formed, where each parallel lookup group contains one or more flow tables, and the one or more flow tables of each parallel lookup group thus can be looked up simultaneously.

A network device in a Software Defined Networking (SDN) network is disclosed. The SDN network contains at least a SDN controller to coordinate traffic forwarding and at least a forwarding element to forward traffic, where the SDN network utilizes a plurality of flow tables to perform lookup for forwarding traffic at the forwarding element. The network device (such as a SDN controller) contains a flow table interface logic configured to receive a set of flow tables and a dependency determination logic configured to determine dependency of flow tables within a forwarding element using a set of dependency determination rules. The network device further contains a dependency degree computing logic configured to construct a dependency graph based on determined dependency of flow tables, the dependency degree computing logic further configured to determine a dependency degree count for each flow table within the forwarding element based on the dependency graph, and the dependency degree computing logic further configured to form a plurality of parallel lookup groups (PLGs) for the forwarding element based on the dependency degree count for each flow table, where each parallel lookup group contains one or more flow tables, and wherein the one or more flow tables of each parallel lookup group has a same dependency degree count. The network device further contains a parallel lookup group database configured to store the PLGs computed by the dependency degree computing logic.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIGS. 5A-C illustrate scenarios causing flow table dependency according to embodiments of the invention.

FIGS. 8A-D illustrate a method for determining flow table dependency degree count according to one embodiment of the invention.

DETAILED DESCRIPTION

Figure 1:
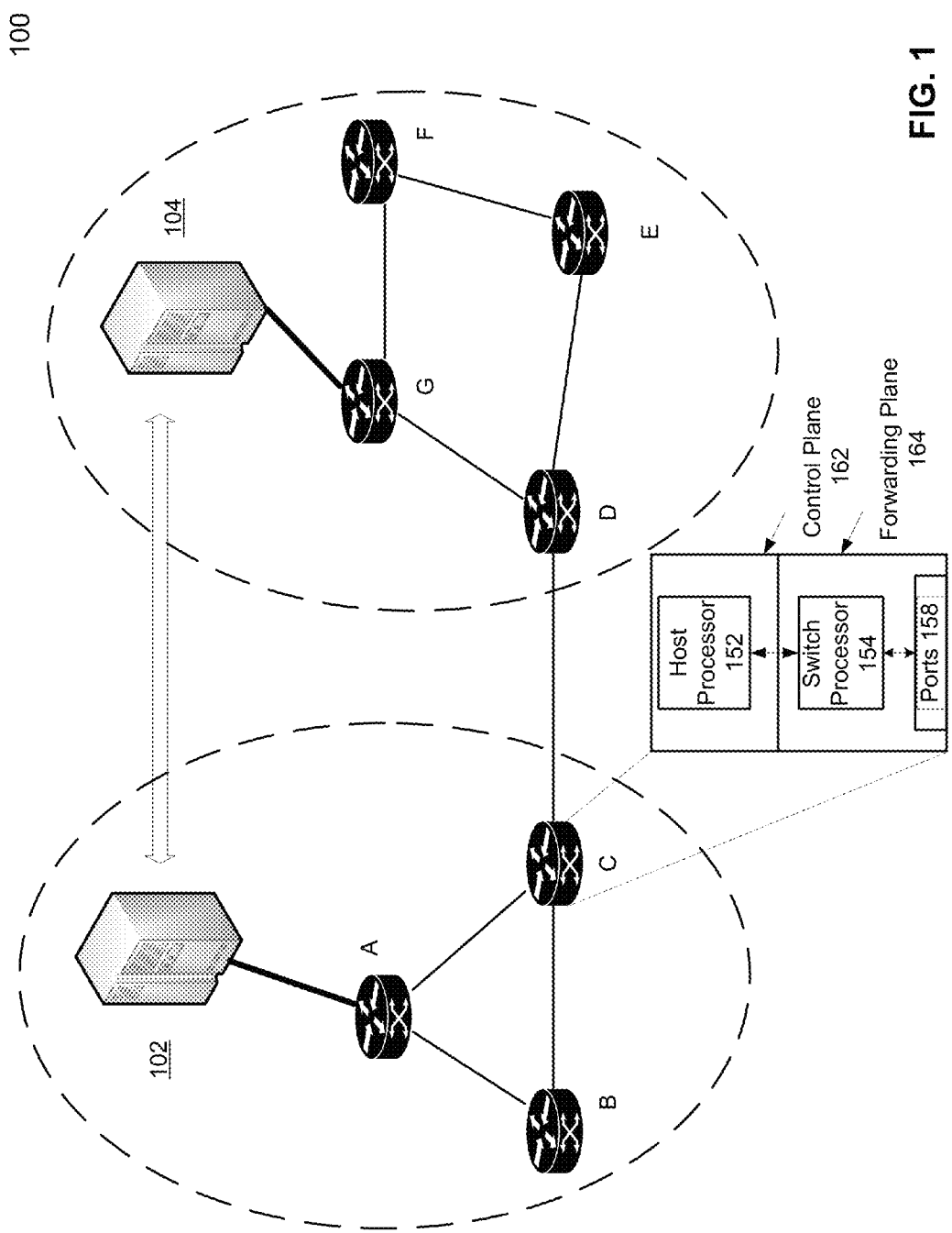
FIG. 1 is a block diagram illustrating a SDN network.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network device (e.g., a switch) is a piece of networking equipment, including hardware and software that communicatively interconnects other equipment on the network (e.g., other network devices, end systems). Some network devices are "multiple services network devices" that provide support for multiple networking functions (e.g., routing, bridging, VLAN (virtual LAN) switching, Layer 2 aggregation, session border control, Quality of Service, and/or subscriber management), and/or provide support for multiple application services (e.g., data, voice, and video). Subscriber end systems (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end systems (e.g., server end systems) belonging to a service or content provider or end systems participating in a peer to peer service, and may include, for example, public webpages (e.g., free content, store fronts, search services), private webpages (e.g., username/password accessed webpages providing email services), and/or corporate networks over VPNs. Typically, subscriber end systems are coupled (e.g., through customer premise equipment coupled to an access network (wired or wirelessly)) to edge network devices, which are coupled (e.g., through one or more core network devices) to other edge network devices, which are coupled to other end systems (e.g., server end systems). A network device is generally identified by its media access (MAC) address, Internet protocol (IP) address/subnet, network sockets/ports, and/or upper OSI layer identifiers.

Network Configuration and Operations

FIG. 1 is a block diagram illustrating a SDN network. SDN network 100 comprises a number of forwarding elements and a number of controllers that instruct the forwarding elements' forwarding behavior. Note a SDN network may contain a much larger number of network devices and existing network devices may be implemented with SDN compatible protocols thus become a part of a SDN network (e.g., an existing IP router may support OpenFlow protocol and thus become a SDN forwarding element or a SDN controller). Thus SDN network 100 is for illustrating logical SDN network configuration only.

Forwarding Elements

The main task of a SDN forwarding element (referred to as an OpenFlow switch or simply switch in OpenFlow parlance when the SDN complies with OpenFlow standards), is to forward packets within the SDN forwarding element from an ingress port to an egress port, according to the rules in flow tables programmed by one or more SDN controllers. Each flow entry contains a set of actions such as forwarding packets to a given port, modifying certain bits in a packet header, encapsulating packets to the SDN controller, or dropping the packets. For the first packet in a new flow, the forwarding element often forwards the packet to the SDN controller to trigger the new flow being programmed. It can also be used to forward slow-path packets such as Internet Control Message Protocol (ICMP) packets to the SDN controller for processing. Note that the concept of a flow can be defined broadly, e.g., a TCP connection, or all traffic from a particular MAC address or IP address. Also note that a packet within a SDN network is defined broadly and it may be an Ethernet frame, an IP network packet, or a message in a proprietary format.

SDN Controllers

A SDN controller (often referred to as a remote controller or controller) adds and removes flow-entries from a flow table. It defines the interconnection and routing among a set of SDN forward elements and other network devices. It also handles network state distribution, such as collecting information from the set of SDN forward elements and distributing forwarding/routing instructions to them. The SDN controller can also be programmed to support new addressing, routing, and complex packet processing applications. The SDN controllers are the "brains" of a SDN network. A forwarding element needs to connect to at least one SDN controller to function correctly.

Referring to FIG. 1, SDN network 100 contains SDN controllers 102 and 104 and a set of forwarding elements (or switches, the terms "forwarding element," "SDN switch," and "switch" are used interchangeably herein below) A-F. Controller 102 (the terms "controller" and "SDN controller" are used interchangeably herein below) manages switches A-C and controller 104 manages switches D-G respectively, and a switch connects to its managing controller through a communication channel and the switch not necessarily has a direct connectivity to a controller (thus the term "remote" controller).

A SDN switch can be viewed logically as containing two main components. One is a control plane and the other is a forwarding plane. A zoom-in view of switch C illustrates the two planes. Switch C contains control plane 162 and forwarding plane 164. Control plane 162 coordinates management and configuration of switch C. Configuration of forwarding plane 164 is achieved by running applications on host processor 152. Host processor 152 usually runs an operating system in order to provide a well-known development environment. Commands from host processor 152 are sent to the switch processor 154 using an interconnect (e.g., a peripheral component interconnect (PCI) bus). Exception packets (e.g., packet for routing and management) are often processed on host processor 152. Switch processor 154 interacts with various forwarding ports 158 of switch C to forward and otherwise process incoming and outgoing packets.

Forwarding plane 164 is responsible for forwarding traffic (forwarding operations includes switching, routing, learning, etc.). It contains switch processor 154 that is designed to provide high throughput at the detriment of a more complex and flexible development environment. Different types high performance memory and hardware accelerator are often found on board of switch processor 154 for achieving the high throughput. In contrast, host processor 152 can be more complex and flexible at the detriment of providing high throughput as it processes more control packets (often referred to as slow path packets) than data packet thus throughput is less mission critical.

When a switch (e.g., switch C) receives a packet associated with a new flow, it does not know where to forward the packet. Thus it sends the packet to its managing SDN controller, controller 102 in this example. Controller 102 receives the packet, and it programs a new flow entry and sends to switch C. Switch C then forwards the packet according to the new flow entry.

A flow entry comprises match fields, counters, and a set of instructions to apply to matching packets. A SDN controller can add, update, and delete flow entries either reactively (in response to a receiving packet) or proactively. A set of flow entries may form a flow table (often referred to simply as table, the terms "flow table" and "table" are used interchangeably herein below), which can be used for a SDN switch to process packets. The earlier SDN networks designed around a large flat table that was vaguely inspired by the functionality provided by a TCAM (Ternary Content Addressable Memory). One major drawback with the approach is that a flat table creates a Cartesian product problem (also known as rule explosion, caused by cross product of rules).

Thus, later SDN networks introduced the concept of multiple flow tables. Multiple flow tables circumvent the table size restrictions of switching hardware (e.g. TCAM has major memory size limitations, in the order of a few megabits). The new approach of multiple flow tables also leads to a better resource utilization, provides opportunities to exploit multiple hardware tables, simplifies SDN controller logic, and allows more intuitive thinking in network design. In a SDN network with multiple flow tables, metadata is used between tables to pass information (often referred to as context).

Figure 2:
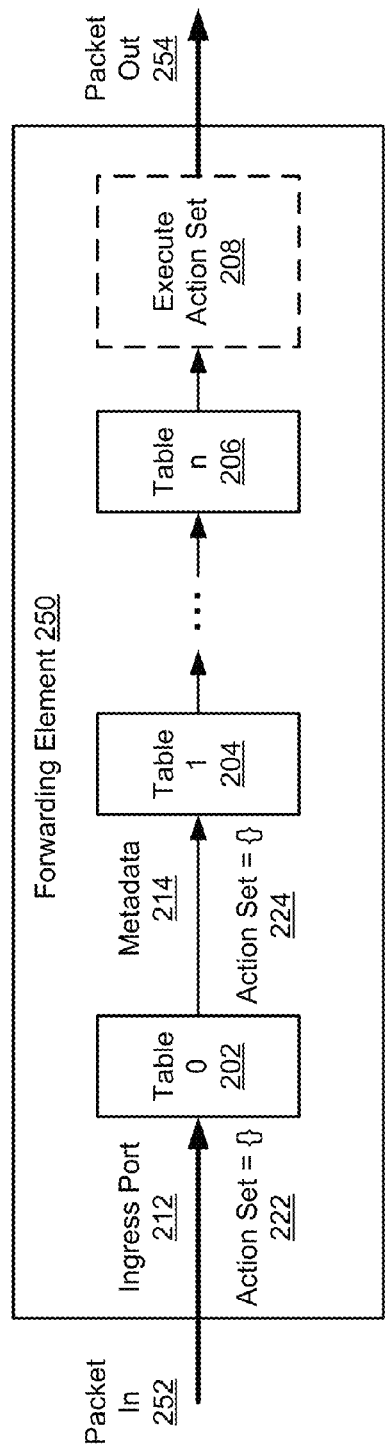
FIG. 2 is a block diagram illustrating multiple flow tables.

FIG. 2 is a block diagram illustrating multiple flow tables according to one embodiment. In FIG. 2, a packet is processed sequentially through multiple tables, one after another. The totality of sequential multiple tables sometimes is referred to as a "forwarding pipeline" or simply "pipeline," i.e. a set of linked flow tables that provide matching, forwarding, packet modification, and etc. in a SDN forwarding element (switch).

Referring to FIG. 2, forwarding element 250 is a forwarding element of a SDN network. It receives a packet at reference 252. The packet is sent to ingress port 212. Ingress port 212 is where a packet enters the forwarding element pipeline of forwarding element 250. Table 0 at reference 202 is the first flow table and matching starts at table 0. If a matching entry is found, the instructions associated with the matching entry of table 0, action set 222, will be executed. A flow entry may modify the action set 222 using a Write-Action instruction or a Clear-Action instruction associated with a particular match. The instruction in the matching flow entry may also explicitly direct the packet to another flow table (using a Goto Instruction), where the same process is repeated again. A flow entry can only direct a packet to a flow table number which is greater than its own flow table number. In other words, pipeline can only go forward and not backward. If the matching flow entry does not direct packets to another flow table, pipeline processing stops at the table. When pipeline processing stops, the packet is processed with an associated action set and usually forwarded.

When action set 222 is applied to the packet, several instructions may be performed. The packet may be modified and match fields may be updated. Action set may be updated (e.g., clear actions and/or write actions instructions) to form action set 224. In addition, metadata, with a maskable register value that is used to carry information from one flow table to the next, may be updated to form metadata 214. The updated metadata 214 and action set 224 are then being utilized for lookup at table 1 (reference 204) to further process the packet. The process may continue until the packet goes through the pipeline at the last table, table n at reference 206 and finish with execution action set at reference 208. Then the packet completes processing at forwarding element 250 and exit at reference 254.

This forwarding model often results in an implementation where the packet is resubmitted to the beginning of a pipeline (e.g., a pipeline implemented in a TCAM or another kind of memories) after it is implied that a packet needs to be sent to a subsequent table. Resubmitting packets at the beginning of the pipeline results in degradation in performance. That is because packets that come from a port have to compete for the same resources as the resubmitted packets.

Another approach to implement multiple table lookup is to use a "run to completion" model where a hardware thread or engine handles the lifecycle of a packet. Each lookup results in stalling the hardware thread or engine until the result of the lookup is returned. Executing a high amount of lookups will most likely results in starving the processing resources while much of the hardware thread or engine is idle.

Flow Table Lookup Parallelization

Sequential flow table lookup approaches may not utilize network resources efficiently as discussed herein above. A few examples may provide a perspective about an alternative approach that will make multiple flow table lookup more effective, and the alternative approach is referred to as flow table lookup parallelization.

(a). For network maintenance, it is often useful for an operator of a network to be able to troubleshoot errors that may occur in her network. A flow table may be used to increment counters based on some tuples (e.g., a tuple for all HTTP traffic). This flow table is for debugging and monitoring; and it may be executed independently from other packet execution operations.

(b). In order to comply with legal intercept requirements (e.g., in the United States, the intercept requirements based on the Communications Assistance for Law Enforcement Act (CALEA)), an operator of a network may be mandated by law to minor traffic matching a certain pattern within the network. A flow table may be used to define one or more intercepted patterns using a tuple. Once incoming packet matches the flow table upon lookup, a flow associated with the incoming packet may be sent to the SDN controller or another external server. The flow table here may apply to only certain packets with specific characteristics and the associated table lookup process is likely independent from other table lookups of the packet.

(c). In order to provide diverse service offerings to customers, an operator of a network may offer service chaining A customer may specify the parameters of services required. For example, a customer may require Deep Packet Inspection (DPI) or firewall for its services due to heighten network security concerns. A SDN network operator may form a flow table lookup sequence for traffic destined to a particular customer. Indeed, even a single customer may have multiple corresponding flow table look up chains for different packet types (e.g., web traffic and email traffic for a single customer follows different service chains for flow table lookups). The difference service chains likely can be processed through a forwarding element independent from each other.

Figure 3:
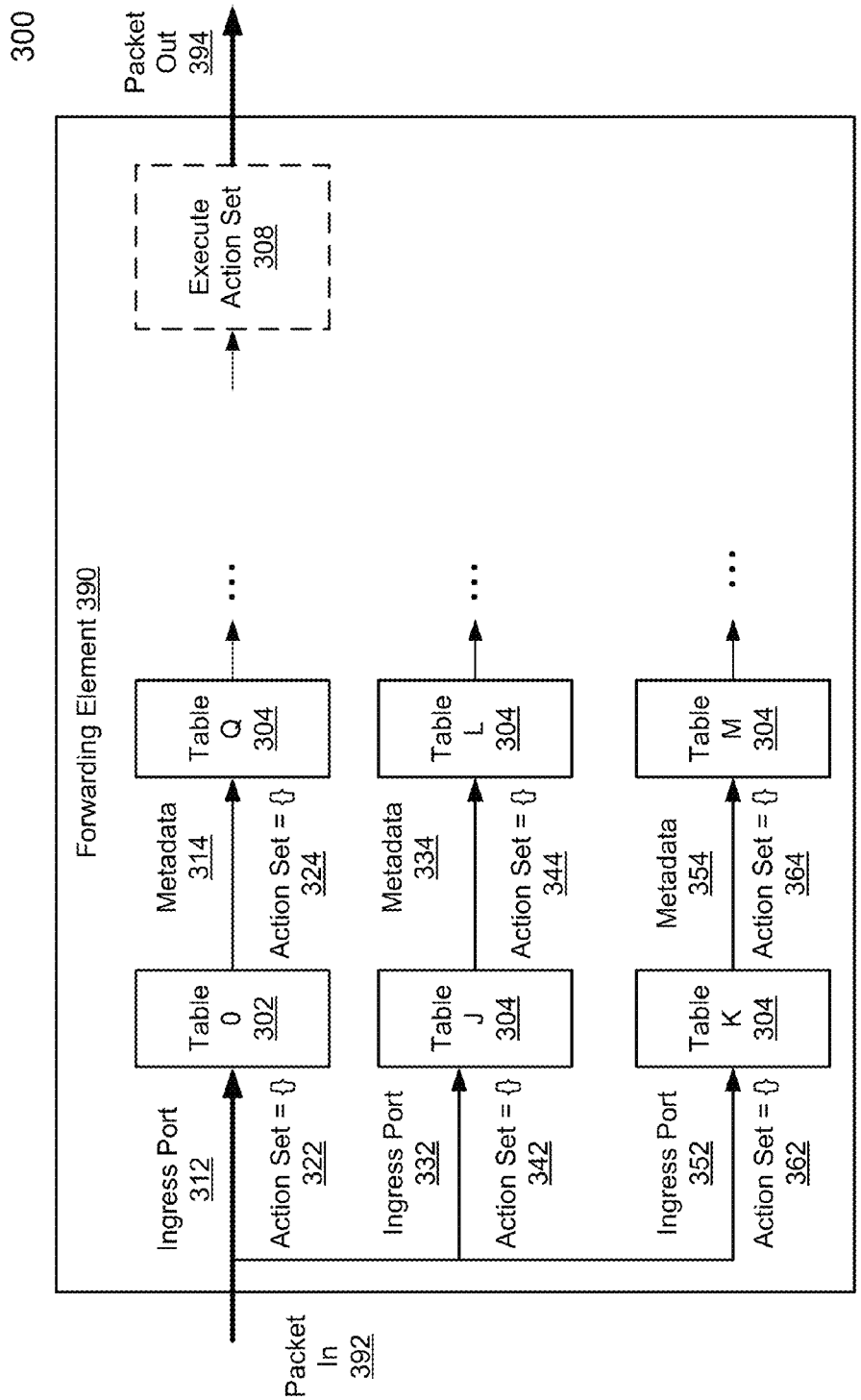
FIG. 3 is a block diagram illustrating flow table lookup parallelization according to one embodiment of the invention.

FIG. 3 is a block diagram illustrating flow table lookup parallelization according to one embodiment of the invention. Forwarding element 390 contains three parallel processing flows. In each processing flow, packet goes through processes similar to the illustration in FIG. 2. With table lookup parallelization, forwarding element 390 may perform multiple flow table lookups concurrently for independent flow tables. For example, in the example (a) above, a packet destined to a customer may go through the processing flow containing tables 0-Q- . . . for normal forwarding process, while the same packet may concurrently go through the processing flow containing tables J-L for debugging/monitoring (e.g., counting packet number to determine whether or not there is a deny-of-service attack). As debugging/monitoring can be processed independently from packet forwarding process, such parallelization adds little complexity for great performance improvement. Note that flow tables are often referred to by numeric orders such as tables 0, 1, and 2 in prior art in a SDN network. In this specification, flow tables are also referred to by letter as numeric reference of flow table implies the order of which flow tables are being looked up. Within the embodiments of the invention, the order of flow tables being looked up sometimes is unknown and the determination is an aspect of embodiments of the invention, thus letters sometimes are used to refer flow tables. For example, in FIG. 3, flow table J may be looked up prior or after flow table K by a packet—the letter referring to flow tables does not imply an order of flow table lookup.

For flow table lookup parallelization to improve SDN network performance, parallel flow tables for lookup need to be independent. Thus, one important consideration of parallelization is to determine dependency among flow tables. Several options are available for determining flow table dependency.

A (simple) first approach is to provide information to a forwarding plane of a forwarding element about which flow tables are independent/dependent in a manual way. For example, in a SDN network complying with OpenFlow protocol, an extension (or a proprietary variation) of OpenFlow protocol may be implemented to provide the information. A drawback of this approach is that a rule enforcement point would need to be introduced in the SDN controller to make sure that a rule breaking the table dependencies would not be introduced.

A second approach is for the SDN controller to analyze the rules within flow tables and determine the flow table dependencies of a forwarding element it manages. In this approach, the information needs to be transported to the forwarding plane and it would require a new interface or an extension to the existing protocol. However, a processor within a SDN controller may possess the computing power for the determination.

A third approach is that a host processor (e.g., host processor 152 in FIG. 1) at a SDN forwarding element (switch) can analyze the rules within flow tables that are sent to it and determine table dependencies. This approach does not require any modification on the existing protocol and it is transparent to the SDN controller.

The embodiments of the invention discussed herein below follow the second or the third approach. That is, a SDN controller or a SDN forwarding element may perform flow table dependency determination based on rules within the flow tables without depending on other processing unit. While sequence of flow table lookup in a forwarding element is unknown a priori, the sequence of flow table lookup is fixed as in a forwarding pipeline or a section of the forwarding pipeline. One goal is to determine the fixed flow table lookup sequence such that field modifications or other operations are not conflicted between tables.

Embodiments of Effective Flow Table Parallelization

Figure 4:
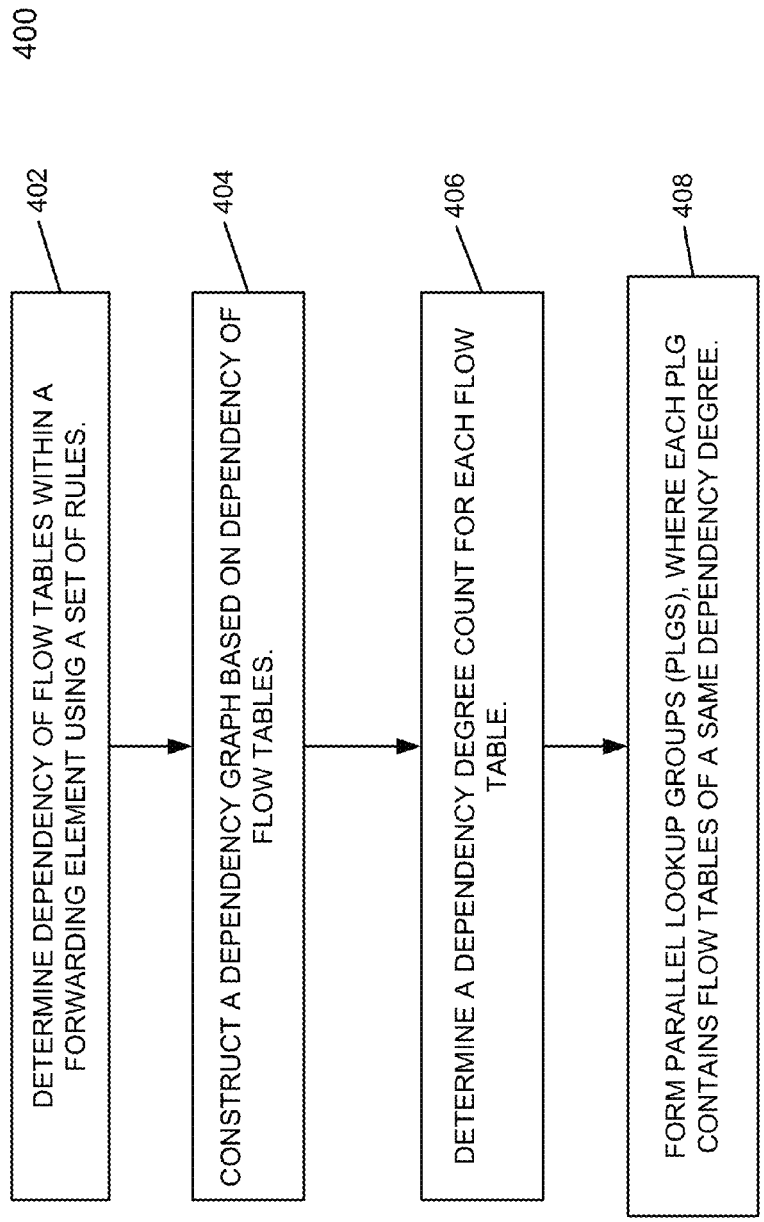
FIG. 4 is a flow diagram illustrating a method of effective flow table lookup parallelization according to one embodiment of the invention.

FIG. 4 is a flow diagram illustrating a method of effective flow table lookup parallelization according to one embodiment of the invention. Method 400 may be performed on a SDN controller or a SDN forwarding element (switch) of a SDN network. The SDN network may comply with Open-Flow specifications. The method may be performed during a system initiation. For example, when a SDN controller or a SDN switch initiates services. The method may also be performed after an event trigger flow table dependency changes. In addition, the method may be performed once a forwarding element receives a packet and needs to determine how to perform flow table lookup—in other words, the method may be run at or near real-time.

At reference 402, method 400 determines dependency of flow tables within a forwarding element using a set of rules. In order to form effective parallel flow table lookup, the method may determine which flow tables of the multiple flow tables in the forwarding pipeline are independent from each other; and when flow tables are dependent, how the dependency relationships exist. The determination may be achieved by considering the match fields and actions in each flow table. The applying the set of rules is discussed in more detail herein below. From reference 402, the dependency between given two flow tables are determined. A flow table may be independent, thus it does not depend on any flow table. Yet an independent (or dependent) flow table may be depended on by another flow table. When two flow tables have a dependency relationship, the flow table being depended on may be referred to as a "dependee" flow table while the dependent flow table is referred to as the "depender" flow table.

At reference 404, a dependency graph is constructed based on dependency determination from reference 402. In the dependency graph, each node is a flow table and a link between two nodes indicates a dependency between two flow tables. A direction of a link from node X to node Y indicates flow table X needs to be looked up before flow table Y. That is, flow table Y depends on flow table X. Through drawing links between all dependency pairs of flow tables, a dependency graph captures all known dependency relationships of flow tables within a forwarding element.

At reference 406, the method determines a dependency degree count of each flow table of the forwarding element. A dependency degree count of a flow table is a numeric number denoting how many flow tables the flow table depends on. For example, a flow table with zero dependency degree count means the flow table does not depend on any other flow table within the forwarding element. Sometimes dependency degree count is referred to as in-degree count, which is a term used in directed graph. The determination of a dependency degree count of flow tables will be discussed in more details herein below.

Onward to reference 408, parallel lookup groups (PLGs) are formed based on a dependency degree count determination of each flow table in reference 406. Each PLG contains one or more flow tables having a same number of dependency degree counts. Thus flow tables within a PLG can be executed in parallel. The PLG membership information may be saved in a variety of data structures, such as a table, an array, or a set. The PLG membership information may be stored at the forwarding element so that a forwarding processor (such as switch processor 156 in FIG. 1) may utilize the information for parallelized lookup processing.

When a packet of a flow first comes in a port of a forwarding element, a forwarding processor of the forwarding element may examine the PLG information and execute the flow table lookups included in a first PLG, where the flow tables within the first PLG do not depend on another flow table (thus dependency degree is zero). Note that in particular processor implementation, a forwarding processor (e.g., a processor with an application-specific integrated circuit (ASIC) or a network processor unit (NPU)) may have a limit on how many flow table lookups it can execute in parallel thus only a specifically limited lookups can be executed in the forwarding processor. After the first PLG is looked up, the flow table lookups included in the following PLGs with increasing dependency degrees are executed.

Once the flow table lookups are completed, the results are examined in order of the flow table IDs, which are in numeric orders. The Apply Actions are executed in order and the Write Actions are stored in the packet context in order. Also, each statistics corresponding to the match entries should be incremented accordingly (table match, flow match, etc.). If one of the lookups results in a no match, the procedure is not executed. If on a particular table match, the resulted match entry contains an output port action, the rest of the table results are ignored. The current PLG information is kept in the context of the packet. If there is more lookups to be done, the packet is recirculated at the beginning of the pipeline or a subsequent lookup phase.

Embodiments of Flow Table Dependency Determination

FIGS. 5A-C illustrate scenarios causing flow table dependency according to embodiments of the invention. In each Figure, a portion of a flow table, which contains one or more flow entries, is shown. Each flow entry contains a match field entry and an instruction field entry (sometimes referred to as action field entry). Note other fields, e.g., counter field, are ignored, as they are not essential to the embodiments of the invention. Match fields are to match against packets in a lookup and contain ingress port and packet headers, and optionally metadata specified by a previous table. Instruction field contain instruction/action to modify the action set or pipeline processing.

FIG. 5A illustrates two entries in flow table 502, which has different Goto-Table actions in their instruction sets. The first entry has flow table j as its next table, and the second entry has flow table k as its next table. In other words, two different flow entries with two different tables as their next tables in the pipeline. In this example, flow table 502 should be looked up before both flow table j and flow table k—both flow table j and flow table k depend on flow table 502.

FIG. 5B illustrates a union of actions in one flow table overlapping with a union of matching fields in another flow table. A union of actions in one flow table is the superset of all actions in the flow table and a union of matching fields is the superset of all matching fields. When there is an overlap of an action in one flow table with a match field in another, the two flow tables can't be executed in parallel. Referring to FIG. 5B, flow table 504 sets source IP address for a packet with matching source Ethernet identifier (ID). Flow table 506 sets multiprotocol label switching (MPLS) label for a packet with matching source IP address. The matching field of flow table 506 (source IP address) is a result of action of flow table 504 (setting source IP address), thus flow table 504 and flow table 506 cannot be looked up independently—the former should be looked up prior to the latter. In this example, flow table 504 is the dependee and flow table 506 is the depender in the dependency relationship between flow tables 504 and 506.

Note match field may contain wildcard (i.e., "don't care") bits. For example, an IP address field in a match field may be like "192.168.X.X." This will be treated as an exact match. That is, regardless of whether there is an exact match or a wildcard match, if the field is among both the action set of the first table and the match fields of the second table, the second table depends on the first table thus should be looked up after the first table.

FIG. 5C illustrates a union of actions in one flow table overlapping with a union of actions in another flow table. When there is an overlap of actions in two flow tables, the two flow tables can't be executed in parallel. Referring to FIG. 5C, flow table 508 sets source IP address with match field of source Ethernet ID; flow table 510 also sets source IP address with match field of source VLAN ID. The two flow tables need to be looked up serially (sequentially) to make sure the corresponding field (source IP address in this example) is updated correctly. In this example, the dependency relationship is determined by the numeric flow table identifiers (IDs), the flow table with the smaller ID is the dependee and the other flow table is the depender.

While FIGS. 5A-C provide examples of determining flow table dependency, the illustrated scenarios may not be exhaustive and other factors to determine flow table dependency may apply to embodiments of the invention according to the principle disclosed herein.

Figure 6:
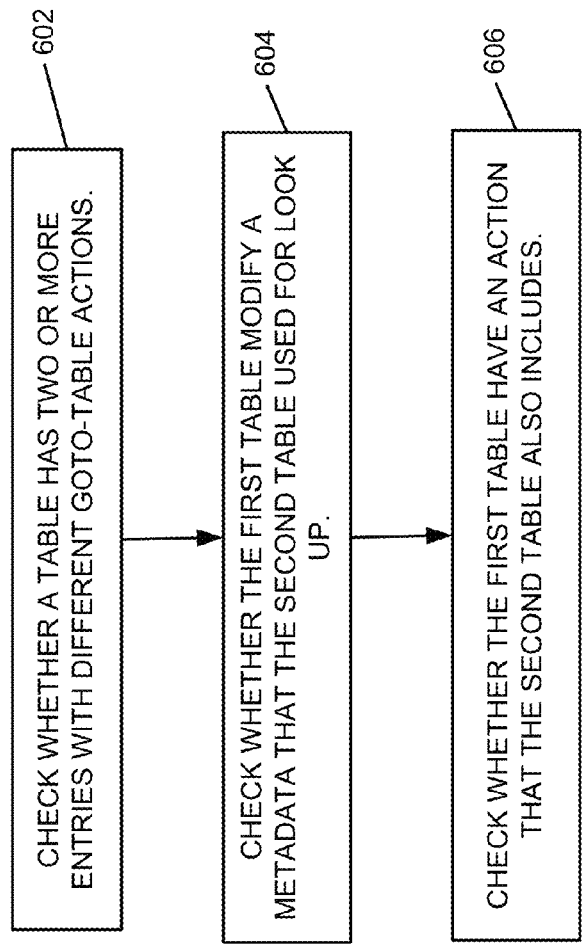
FIG. 6 illustrates a method for determining flow table dependency according to one embodiment of the invention.

FIG. 6 illustrates a method for determining flow table dependency according to embodiments of the invention. Method 600 may be implemented in a SDN controller or a SDN forwarding element (switch). In a SDN forwarding element, method 600 may be implemented in a host processor like host processor 152 in FIG. 1. Method 600 may process through all flow tables in a forwarding element.

At reference 602, method 600 examines a flow table to determine whether it has two or more flow entries with different Goto-table actions. If the flow table contains two or more flow entries with different Goto-table actions, all the tables in the Goto-table actions depends on the flow table.

At reference 604, the method examines that for any given two flow tables, whether a flow table modifies a metadata the other flow table used for lookup. Metadata carries information from one flow table to the next, and when the former flow table modifies metadata (e.g., through instruction as illustrated in FIG. 5B) that the other flow table used for lookup (e.g., utilizing match field), the two flow tables have a dependency relationship with the former flow table being the dependee. Note the two flow tables can be looked up and modified part of the metadata where there is no overlap (e.g., determined by using metadata bit mask). In which case the two flow tables are not dependent on each other. The examination in reference 604 may be performed in all permutations of two flow tables within a forwarding element.

At reference 606, the method examines that for any given two flow tables, whether a flow table contains an action in its instructions that the other flow table also contains. When two flow tables perform same actions, they need to be looked up sequentially to maintain data integrity. Similar to the examination in reference 604, the examination in reference 606 may be performed in all permutations of two flow tables within a forwarding element.

After method 600 completes, dependency of all flow tables within a forwarding element is determined and the dependency then can be used in an intelligent flow table parallelization. Note the three separate examinations may be performed in an order differently than illustrated in FIG. 6 as the examinations do not depend on each other, and the principle within can be applied to other implementations for dependency determination. Also, in some embodiments of the invention, not all three examinations are performed, while in other embodiments of the invention, more than the three examinations are performed.

Embodiments of Determining Flow Table Dependency Degree Count

Figure 7:
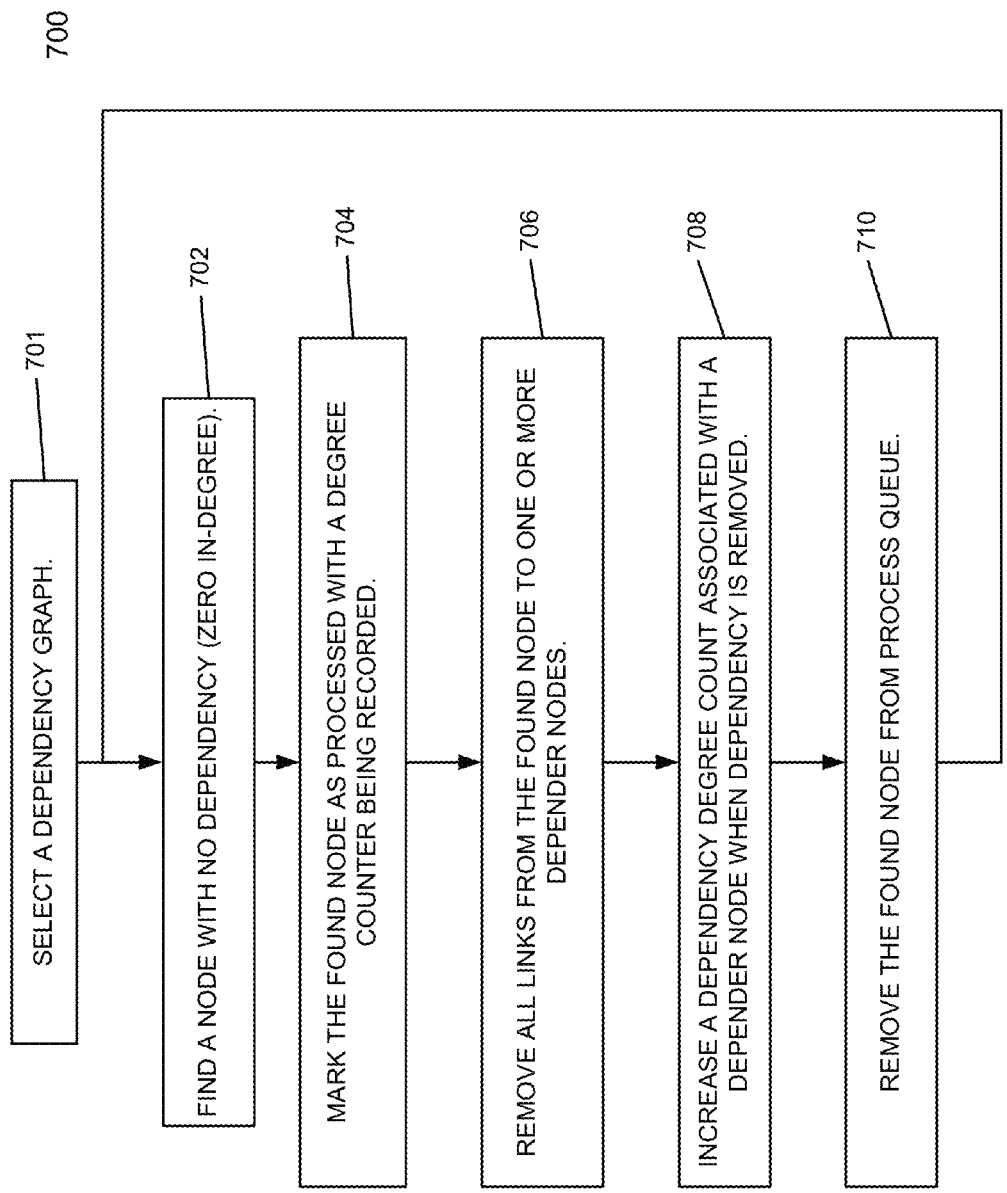
FIG. 7 is a flow diagram illustrating a method for determining flow table dependency degree count according to one embodiment of the invention.

FIG. 7 is a flow diagram illustrating a method for determining flow table dependency degree count according to one embodiment of the invention. As discussed herein above, based on dependency determination of all flow tables within a forwarding element, a dependency graph may be constructed. In the dependency graph, each node is a flow table and a link between two nodes indicates a dependency between two flow tables. A direction of a link from node X to node Y indicates flow table X needs to be looked up before flow table Y. That is, flow table Y depends on flow table X. Through drawing links between all dependency pairs of flow tables, a dependency graph captures all known dependency relationships of flow tables within a forwarding element. With a known dependency graph, FIG. 7 discloses a method of determining flow table dependency degree count. Method 700 may be performed by a SDN forwarding element (e.g., host processor 152 in FIG. 1) or a SDN controller (e.g., controller 102 in FIG. 1).

Method 700 starts with selecting a dependency graph at reference 701. With known dependencies of flow tables, a dependency graph for a forwarding element can be constructed. In the dependency graph, a node with no dependency is found at reference 702. A node with no dependency has zero in-degree and depends on no other nodes in the dependency graph. When there are multiple nodes with zero in-degree, a node with the maximum out-degree is selected. That is, the method selects a dependee node with the most depender nodes. The rationale is that the larger out-degree a dependee node has, the more depender nodes are waiting for the dependee node to finish before any of the depender nodes can be executed.

The found node then is marked as processed at reference 704 with its current degree count being recorded. If the found node has not been processed before, its current degree count will be zero. Being "processed" means that the relative time to process the node has been determined. Once the found node is processed, all links from the found node to its depender nodes are removed at reference 706. Thus, in the updated dependency graph, the dependencies of depender nodes to the depender node are reduced. Then at reference 708, the dependency degree count associated with each dependee node is increased by one. That is, the dependee node is recorded with a known dependency degree count. Onward to reference 710, the found dependee node is removed from the process queue, and another node with no dependency in the updated dependency graph is selected and the process repeated starting at reference 702. Since more links are removed at each iteration, all links between links will be removed eventually, at which point the process completes. After method 700 completes, each node will contain a dependency degree count indicates the node's dependency degree.

FIGS. 8A-D illustrate a method for determining flow table dependency degree count according to one embodiment of the invention. FIG. 8A illustrate a dependency graph for a forwarding element with seven nodes representing seven flow tables. Node A does not depend on any other nodes and it is the only node does not depend on any other nodes, thus it is selected for processing at FIG. 8B. In FIG. 8B, node A is marked as processed, and the marking is represented by changing the node representation from a square to a circle. After node A is processed, its current dependency degree count is recorded. Since it does not depend on any other nodes, its dependency degree count is zero.

Then at FIG. 8C, all links from node A to other nodes are removed, and the dependee nodes increase their dependency degree count by one. Since none of the nodes has dependency degree count set at this point, the counter is default at zero before the increasing of dependency degree count. Thus both nodes B and C now have dependency degree counts of one after removing links from node A to nodes B and C.

Onward to FIG. 8D, the processed node, node A is removed from the process queue and the process starts over again to select a node with no dependency. Now both nodes and C have zero in-degree. In this case, the node with the most out-degree is selected for processing. Node B has out-degree of two as both nodes D and E depend on node B while node C only has out-degree of one, thus node B is selected for processing. Node B is marked as processed. The same process for node A then is repeated for node B. After node B is processed, nodes C and F go through the same process. After the full process, dependency counts for all seven nodes are determined.

Embodiments of Parallel Lookup Groups (PLGs)

Figure 9:
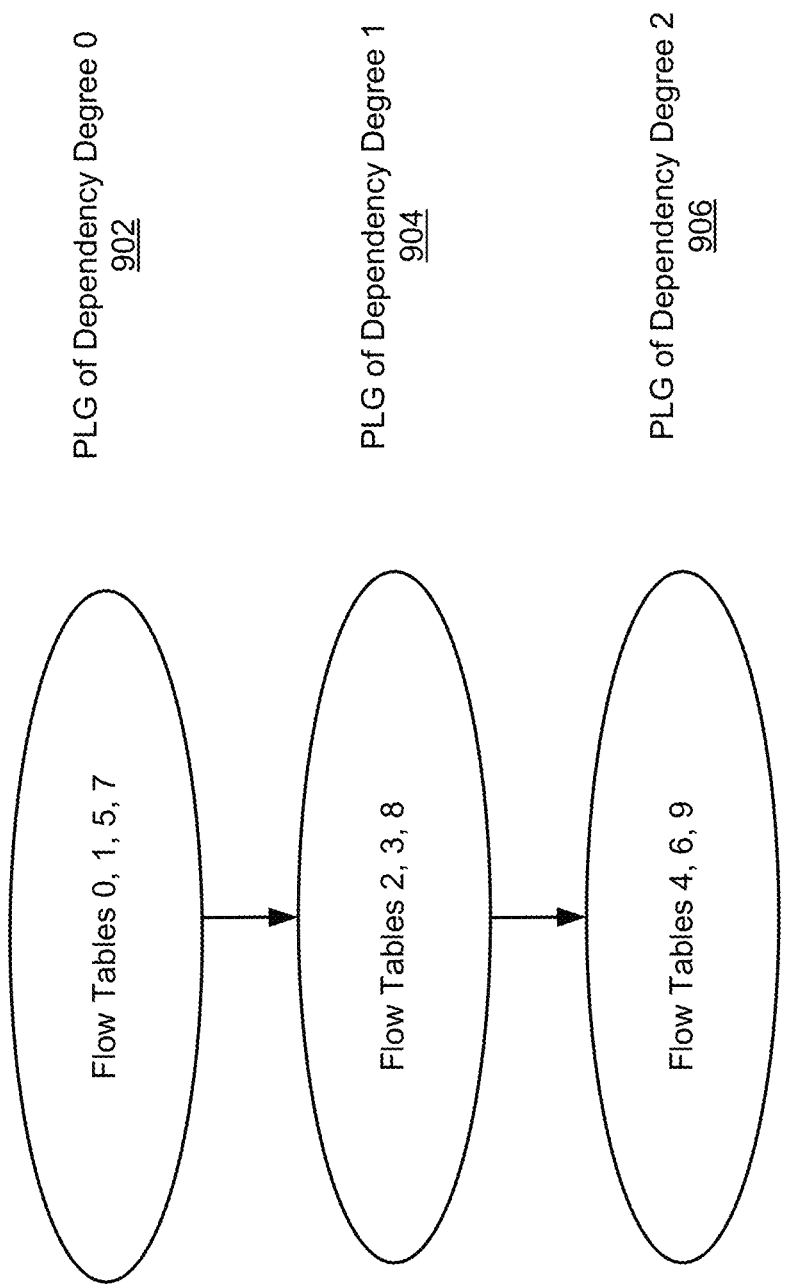
FIG. 9 illustrates an implementation of parallel lookup groups (PLGs) according to one embodiment of the invention.

FIG. 9 illustrates an implementation of parallel lookup groups according to one embodiment of the invention. After dependency degree counts are determined for each node (flow table) of a forwarding element, the dependency degree counts are then used to form parallel lookup groups (PLGs) for the forwarding element. The PLG membership information of a forwarding element may be saved in a variety of data structures, such as a table, an array, or a set. The PLG membership information may be stored at the forwarding element so that a forwarding processor may utilize the information for parallelized lookup processing.

Referring to FIG. 9, flow tables 0, 1, 5, and 7 do not depend on any other flow table in a forwarding element, and thus they are in the PLG of dependency degree of zero at reference 902. The lookups of these flow tables will be executed ahead of tables 2, 3, and 8, The lookups of which will in turn be executed ahead of tables 4, 6, and 9, as the former group is in PLG of dependency degree of one at reference 904 and the latter group is in PLG of dependency degree of two at reference 906.

With parallelized table lookups, a forwarding element may execute independent lookups concurrently without degrading system performance. In this example, up to four independent flow tables may be looked up concurrently (tables 0, 1, 5, and 7 at PLG of zero dependency), and the parallelization improves the efficiency of a SDN network.

An embodiment of the invention is illustrated with pseudo code below. Note that conditions 1, 2, or 3 are the three tests illustrated in FIG. 6.

| Algorithm 1 Parallel lookup optimization algorithm |
|---|
| procedure Optimize_Lookup(T)<br>  for Table i in T do<br>    for Table j in T, j ≠ i do<br>      Create node i and j in G<br>      for every entry $e_m^i$ and $e_n^j$ in i, j do |

| Algorithm 1 Parallel lookup optimization algorithm |
|---|
|         if Relationship($e_m^i$, $e_n^j$) satisfies condition 1 or 2 or 3 then<br>          Create i → j, break;<br>        end if<br>        if Relationship($e_n^j$, $e_m^i$) satisfies condition 1 or 2 or 3 then<br>          Create j → i, break;<br>        end if<br>      end for<br>    end for<br>  end for<br>  groupNum = 0;<br>  while ∃ unprocessed n in G do<br>    for every node n in G do<br>      if indegree(n)==0 then<br>        $I_G = I_G \cup n$<br>      end if<br>    end for<br>    Sort $I_G$ according to the outdegree<br>    groupNum + +<br>    for Every node n' ∈ Sorted$I_G$ do<br>      Enqueue n'<br>      group(n') = groupNum<br>    end for<br>    while QUEUE ≠ do<br>      dequeue the top node n'<br>      for every node k with edge n' → k do<br>        remove the edge n' → k<br>      end for<br>    end while<br>  end while |

Network Devices Implementing Flow Table Lookup Parallelization

Figure 10:
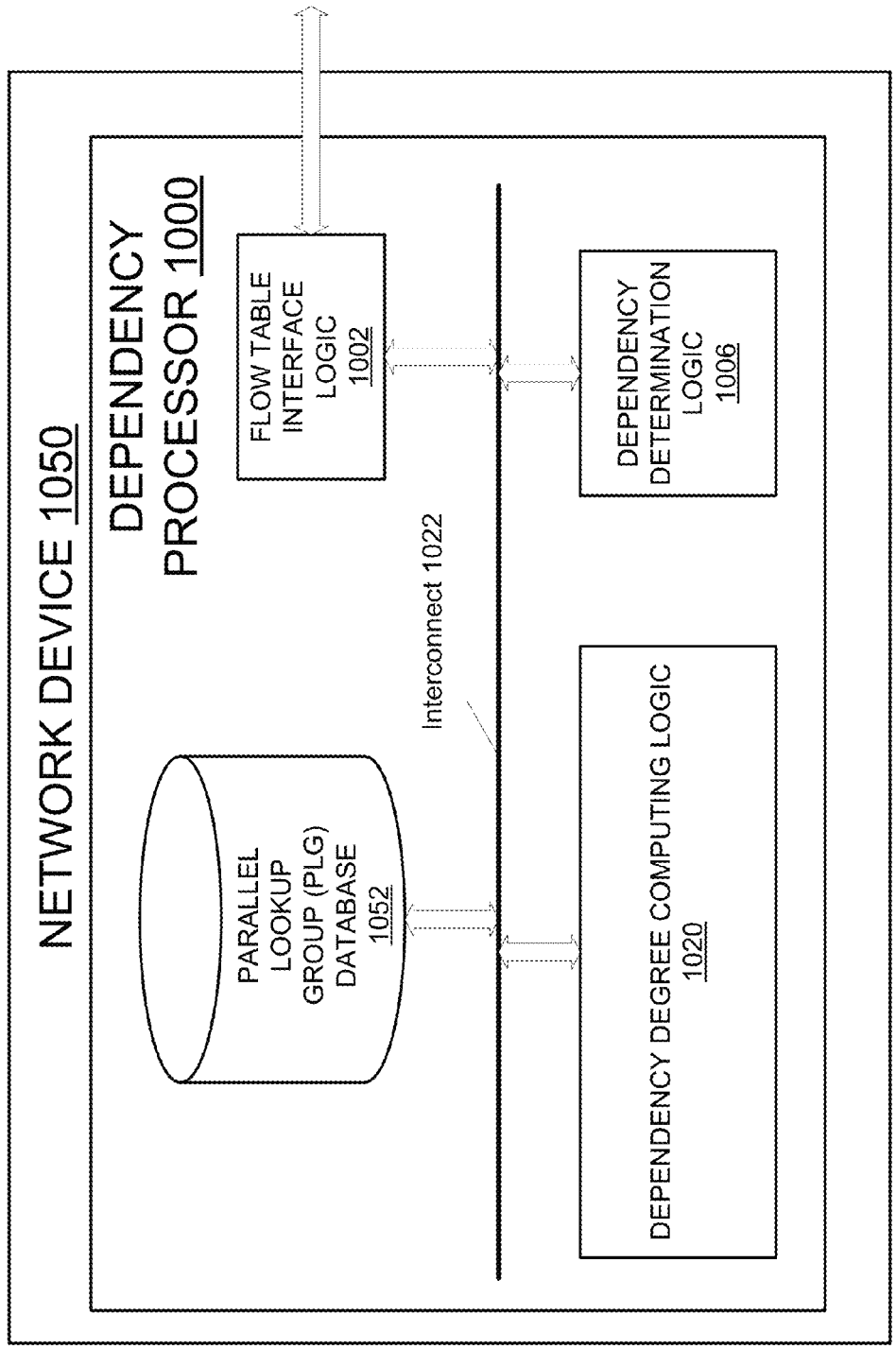
FIG. 10 is a block diagram illustrating a network device containing a processor implementing flow table lookup parallelization according to one embodiment of the invention.

FIG. 10 is a block diagram illustrating a network device containing a processor implementing flow table lookup parallelization according to one embodiment of the invention. Dependency processor 1000 may be a standalone processor or a part of a processor within a SDN forwarding element or a SDN controller, i.e., network device 1050 may be a forwarding element or a controller. When dependency processor 1000 is a part of a larger processor, it may have dedicated NPU or share processing unit with other application. When dependency processor 1000 is a part of a SDN forwarding element, it's likely implemented in the control plane, for example, as a part of a host processor of the SDN forwarding element.

Processor 1000 may contain flow table interface logic 1002, dependency determination logic 1006, dependency degree computing logic 1020, and parallel lookup groups (PLGs) database 1052. Various logics are interconnected through interconnect 1022. Note that various logics can be implemented as a single unit or multiple units, the unit or units integrate various logics and perform similar function as the logics of Node 1000, and these logics can be implemented in software, hardware or a combination thereof. In addition, some logics illustrated in FIG. 10 may be implemented outside of processor 1000 but communicatively coupled with processor 1000.

Flow table interface logic 1002 is configured to interface various flow tables. It receives flow tables from other elements of a SDN network, and it outputs dependency determination for optimizing flow table lookup parallelization. Dependency determination logic is configured to determine flow table lookup dependency for a given pair of flow tables. Dependency degree computing logic computes dependency degrees after dependency determination logic determines dependency relationships of flow tables with a forwarding element. The result of dependency degree computing logic 1020 is saved to parallel lookup group (PLG) database 1052, which stores PLG membership information for the forwarding element.

In one embodiment, flow table interface logic 1002 is configured to receive flow tables in a forwarding element, and it forwards the information to dependency determination logic 1006, which determines all dependency relationships between all flow tables of the forwarding element. The determination of dependency determination logic 1006 then is used to construct a dependency graph. The dependency graph is passed to dependency degree computing logic 1020 to compute dependency degree of each flow table. The determination then is used to form parallel lookup groups (PLG) and the PLG membership information is stored to PLG database 1052, which can be used for parallelizing flow table lookups.

The operations of the flow diagram will be described with reference to the exemplary embodiment of FIG. 10. However, it should be understood that the operations of flow diagrams can be performed by embodiments of the invention other than those discussed with reference to FIGS. 4, 6, and 7, and the embodiments discussed with reference to FIG. 10 can perform operations different than those discussed with reference to the flow diagrams of FIGS. 4, 6, and 7.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a Software Defined Networking (SDN) network, wherein the SDN network contains at least a SDN controller to coordinate traffic forwarding and at least a forwarding element to forward traffic, wherein the SDN network utilizes a plurality of flow tables to perform lookup for forwarding traffic at the forwarding element, the method comprising:
   determining dependency of flow tables within the forwarding element using a set of one or more dependency determination rules;
   constructing a dependency graph based on determined dependency of flow tables;
   determining a dependency degree count for each flow table within the forwarding element based on the dependency graph; and
   forming a plurality of parallel lookup groups (PLGs) for the forwarding element based on the dependency degree count for each flow table, wherein each PLG contains one or more flow tables, and wherein the one or more flow tables of each PLG has a same dependency degree count.

2. The method of claim 1, wherein determining dependency of flow tables within the forwarding element includes at least one of:
   determining that a flow table is not independent in response to a finding that the flow table has at least two entries containing different Goto table actions;
   determining that a flow table is not independent in response to a finding that the flow table modifies a metadata used for table lookup by another flow table; and
   determining that a flow table is not independent in response to a finding that the flow table contains an action that another second flow table contains.

3. The method of claim 1, wherein each node in the dependency graph is a flow table, wherein a link between two nodes in the dependency graph indicates a depender-dependee relationship, and wherein a dependee flow table is place in front of a depender flow table in a flow table pipeline.

4. The method of claim 1, wherein determining a dependency degree count for each flow table within the forwarding element includes:
   finding a node with no dependency (referred to as zero in-degree);
   marking the found node as processed with a degree count being recorded for the found node;
   removing all links from the found node to one or more depender nodes;
   increasing a degree count associated with a depender node when a link to the depender node is removed; and
   removing the found node from the process queue.

5. The method of claim 1, wherein the operations of the method are performed on a forwarding element.

6. The method of claim 1, wherein the operations of the method are performed on a SDN controller.

7. The method of claim 1, wherein the operations of the method are performed after a flow table dependency changing event occurs.

8. The method of claim 1, wherein the operations of the method are performed after a packet is received at the forwarding element.

9. The method of claim 1, wherein the SDN network complies with OpenFlow specifications.

10. A network device in a Software Defined Networking (SDN) network, wherein the SDN network contains at least a SDN controller to coordinate traffic forwarding and at least a forwarding element to forward traffic, wherein the SDN network utilizes a plurality of flow tables to perform lookup for forwarding traffic at the forwarding element, the network device comprising:
    a flow table interface logic configured to receive a set of flow tables;

a dependency determination logic configured to determine dependency of flow tables within a forwarding element using a set of dependency determination rules;

a dependency degree computing logic configured to construct a dependency graph based on determined dependency of flow tables, the dependency degree computing logic further configured to determine a dependency degree count for each flow table within the forwarding element based on the dependency graph, and the dependency degree computing logic further configured to form a plurality of parallel lookup groups (PLGs) for the forwarding element based on the dependency degree count for each flow table, wherein each PLG contains one or more flow tables, and wherein the one or more flow tables of each PLG has a same dependency degree count; and a parallel lookup group database configured to store the PLGs computed by the dependency degree computing logic.

11. The network device of claim 10, wherein the dependency determination logic determines dependency of flow tables within a forwarding element based on at least one of the following rules:

determining that a flow table is not independent in response to a finding that the flow table has at least two entries containing different Goto table actions;

determining that a flow table is not independent in response to a finding that the flow table modifies a metadata used for table lookup by another flow table; and determining that a flow table is not independent in response to a finding that the flow table contains an action that another second flow table contains.

12. The network device of claim 10, wherein each node in the dependency graph is a flow table, wherein a link between two nodes in the dependency graph indicates a depender-dependee relationship, and wherein a dependee flow table is place in front of a depender flow table in a flow table pipeline.

13. The network device of claim 10, wherein the dependency degree computing logic determines a dependency degree count for each flow table within the forwarding element based on the dependency graph by performing the following:

finding a node with no dependency (referred to as zero in-degree);

marking the found node as processed with a degree count being recorded for the found node;

removing all links from the found node to one or more depender nodes;

increasing a degree count associated with a depender node when a link to the depender node is removed; and removing the found node from the process queue.

14. The network device of claim 10, wherein the network device is a forwarding element of the SDN network.

15. The network device of claim 10, wherein the network device is a SDN controller.

16. The network device of claim 10, wherein the operations of dependency determination logic and dependency degree computing logic are performed after a flow table dependency changing event occurs.

17. The network device of claim 10, wherein the operations of dependency determination logic and dependency degree computing logic are performed after a packet is received at the forwarding element.

18. The network device of claim 10, wherein the SDN network complies with OpenFlow specifications.

19. A method implemented in a Software Defined Networking (SDN) network, wherein the SDN network contains at least a SDN controller to coordinate traffic forwarding and at least a forwarding element to forward traffic, wherein the SDN network utilizes a plurality of flow tables to perform lookup for forwarding traffic at the forwarding element, the method comprising:

determining dependency of flow tables within the forwarding element using a set of one or more dependency determination rules, including at least one of:

determining that a flow table is not independent in response to a finding that the flow table has at least two entries containing different Goto table actions;

determining that a flow table is not independent in response to a finding that the flow table modifies a metadata used for table lookup by another flow table; and determining that a flow table is not independent in response to a finding that the flow table contains an action that another second flow table contains;

constructing a dependency graph based on determined dependency of flow tables;

determining a dependency degree count for each flow table within the forwarding element based on the dependency graph by:

finding a node with no dependency (referred to as zero in-degree);

marking the found node as processed with a degree count being recorded for the found node;

removing all links from the found node to one or more depender nodes;

increasing a degree count associated with a depender node when a link to the depender node is removed; and removing the found node from the process queue;

forming a plurality of parallel lookup groups (PLGs) for the forwarding element based on the dependency degree count for each flow table, wherein each PLG contains one or more flow tables, and wherein the one or more flow tables of each PLG has a same dependency degree count.

20. A network device in a Software Defined Networking (SDN) network, wherein the SDN network contains at least a SDN controller to coordinate traffic forwarding and at least a forwarding element to forward traffic, wherein the SDN network utilizes a plurality of flow tables to perform lookup for forwarding traffic at the forwarding element, the network device comprising:

a flow table interface logic configured to receive a set of flow tables;

a dependency determination logic configured to determine dependency of flow tables within a forwarding element using a set of dependency determination rules, wherein the dependency determination logic determines dependency of flow tables within a forwarding element based on at least one of the following rules:

determining that a flow table is not independent in response to a finding that the flow table has at least two entries containing different Goto table actions;

determining that a flow table is not independent in response to a finding that the flow table modifies a metadata used for table lookup by another flow table; and determining that a flow table is not independent in response to a finding that the flow table contains an action that another second flow table contains;

a dependency degree computing logic configured to construct a dependency graph based on determined dependency of flow tables, the dependency degree computing logic further configured to determine a dependency degree count for each flow table within the forwarding element based on the dependency graph by:

finding a node with no dependency (referred to as zero in-degree);

marking the found node as processed with a degree count being recorded for the found node;

removing all links from the found node to one or more depender nodes;

increasing a degree count associated with a depender node when a link to the depender node is removed; and removing the found node from the process queue, and the dependency degree computing logic further configured to form a plurality of parallel lookup groups (PLGs) for the forwarding element based on the dependency degree count for each flow table, wherein each PLG contains one or more flow tables, and wherein the one or more flow tables of each PLG has a same dependency degree count; and a parallel lookup group database configured to store the PLGs computed by the dependency degree computing logic.

* * * * *

UNITED STATES PATENT AND TRADEMARK OFFICE
CERTIFICATE OF CORRECTION

PATENT NO.        : 8,964,752 B2
APPLICATION NO.   : 13/855611
DATED             : February 24, 2015
INVENTOR(S)       : Zhang et al.

Page 1 of 1

It is certified that error appears in the above-identified patent and that said Letters Patent is hereby corrected as shown below:

In the Specification

In Column 7, Line 46, delete "minor traffic" and insert -- mirror traffic --, therefor.

In Column 10, Line 48, delete "jas" and insert -- j as --, therefor.

Signed and Sealed this
Twentieth Day of October, 2015

Michelle K. Lee
*Director of the United States Patent and Trademark Office*